United States Patent
Saito

(10) Patent No.: US 10,810,973 B2
(45) Date of Patent: Oct. 20, 2020

(54) INFORMATION PROCESSING DEVICE AND INFORMATION PROCESSING METHOD

(71) Applicant: SONY CORPORATION, Tokyo (JP)

(72) Inventor: Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,689

(22) PCT Filed: Aug. 15, 2017

(86) PCT No.: PCT/JP2017/029344
§ 371 (c)(1),
(2) Date: Feb. 6, 2019

(87) PCT Pub. No.: WO2018/043115
PCT Pub. Date: Mar. 8, 2018

(65) Prior Publication Data
US 2019/0189088 A1 Jun. 20, 2019

(30) Foreign Application Priority Data
Aug. 29, 2016 (JP) .................................. 2016-166784

(51) Int. Cl.
*G09G 5/38* (2006.01)
*G06F 3/01* (2006.01)
(Continued)

(52) U.S. Cl.
CPC ................ *G09G 5/38* (2013.01); *G06F 3/01* (2013.01); *G06F 3/0481* (2013.01); *G06F 3/16* (2013.01);
(Continued)

(58) Field of Classification Search
CPC .............. G09G 5/38; G09G 2358/00; G09G 2340/0464; G09G 2354/00; G06F 3/165;
(Continued)

(56) References Cited

U.S. PATENT DOCUMENTS

2007/0268392 A1* 11/2007 Paalasmaa ............. G01C 21/20
348/333.02
2011/0134470 A1 6/2011 Naito
(Continued)

FOREIGN PATENT DOCUMENTS

JP 2001-306464 A 11/2001
JP 2006-081117 A 3/2006
(Continued)

OTHER PUBLICATIONS

International Search Report and Written Opinion of PCT Application No. PCT/JP2017/029344, dated Oct. 3, 2017, 10 pages of ISRWO.

*Primary Examiner* — Xilin Guo
(74) *Attorney, Agent, or Firm* — Chip Law Group

(57) ABSTRACT

There is provided an information processing device and an information processing method that, when information is conveyed to a user to whom the information is desired to be conveyed, enable to convey the information to the user while the information is concealed from the other users. The information processing device includes a positional relationship detection unit that detects a positional relationship among a plurality of users, a detection unit that detects a blind spot of a first user among the plurality of users, and a display control unit that performs control for displaying information in the blind spot detected by the detection unit. The information processing device further includes a sight line detection unit that detects a sight line direction of a second user, and the display control unit performs control for displaying information in a blind spot located in the sight line direction of the second user.

18 Claims, 13 Drawing Sheets

(51) Int. Cl.
*G06F 3/0481* (2013.01)
*G06F 3/16* (2006.01)
*H04S 7/00* (2006.01)
*H04R 1/32* (2006.01)

(52) U.S. Cl.
CPC ............ *G06F 3/165* (2013.01); *H04R 1/323* (2013.01); *H04S 7/00* (2013.01); *G09G 2340/0464* (2013.01); *G09G 2354/00* (2013.01); *G09G 2358/00* (2013.01); *H04R 2499/15* (2013.01)

(58) Field of Classification Search
CPC . G06F 3/16; G06F 3/0481; G06F 3/01; G06F 3/147; G06F 3/04847; G06F 3/04886; H04R 1/323; H04R 2499/15; H04R 1/32; H04S 7/00; G02B 27/0179; G02B 2027/014; G06T 11/60
See application file for complete search history.

(56) References Cited

U.S. PATENT DOCUMENTS

| | | | | |
|---|---|---|---|---|
| 2012/0176525 | A1* | 7/2012 | Garin | G01C 21/20 |
| | | | | 348/333.02 |
| 2012/0182313 | A1* | 7/2012 | Ahn | G06T 19/00 |
| | | | | 345/633 |
| 2018/0124360 | A1* | 5/2018 | Okuda | H04N 7/181 |
| 2019/0313183 | A1* | 10/2019 | Saito | G08B 15/00 |

FOREIGN PATENT DOCUMENTS

| | | |
|---|---|---|
| JP | 2007-266754 A | 10/2007 |
| JP | 2009-026200 A | 2/2009 |
| JP | 2011-081615 A | 4/2011 |
| JP | 2011-118842 A | 6/2011 |
| JP | 2012-027641 A | 2/2012 |
| JP | 2013-120373 A | 6/2013 |
| JP | 2016-024747 A | 2/2016 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/029344 filed on Aug. 15, 2017, which claims priority benefit of Japanese Patent Application No. JP 2016-166784 filed in the Japan Patent Office on Aug. 29, 2016. Each of the above-referenced applications is hereby incorporated herein by reference in its entirety.

TECHNICAL FIELD

The present technology relates to an information processing device, an information processing method, and a program, and relates to, for example, an information processing device, an information processing method, and a program that are capable of, when information is conveyed to a user to whom the information is desired to be conveyed, conveying the information to the user while the information is concealed from the other users.

BACKGROUND ART

Patent Document 1 proposes that in such an environment in which a third person suddenly appears while a display device is used, specific data for individual use is prevented from being known to the third person.

CITATION LIST

Patent Document

Patent Document 1: Japanese Patent Application Laid-Open No. 2014-56345

SUMMARY OF THE INVENTION

Problems to be Solved by the Invention

According to Patent Document 1, processing of preventing information from being seen by a third person causes a user to be brought into a state in which the user himself/herself cannot see the information either.

The present technology has been devised in consideration of such a situation, and when information is conveyed to a user to whom the information is desired to be conveyed, enables to convey the information to the user while the information is concealed from the other users.

Solutions to Problems

An information processing device according to one aspect of the present technology includes: a positional relationship detection unit that detects a positional relationship among a plurality of users; a detection unit that detects a blind spot of a first user among the plurality of users; and a display control unit that performs control for displaying information in the blind spot detected by the detection unit.

An information processing method according to one aspect of the present technology includes the steps of: detecting a positional relationship among a plurality of users; detecting a blind spot of a first user among the plurality of users; and performing control for displaying information in the detected blind spot.

A program according to one aspect of the present technology causes a computer to execute processing including the steps of: detecting a positional relationship among a plurality of users; detecting a blind spot of a first user among the plurality of users; and performing control for displaying information in the detected blind spot.

In the information processing device, the information processing method and the program according to one aspect of the present technology, a positional relationship among a plurality of users is detected, a blind spot of a first user among the plurality of users is detected, and information is displayed in the detected blind spot.

It should be noted that the information processing device may be an independent device, or may be an internal block that forms one device.

In addition, the program can be provided by being transmitted through a transmission medium, or by being recorded on a recording medium.

Effects of the Invention

According to one aspect of the present technology, when information is conveyed to a user to whom the information is desired to be conveyed, the information can be conveyed to the user while the information is concealed from the other users.

It should be noted that the effects described herein are not necessarily limited, and may be any one of the effects described in the present disclosure.

MODES FOR CARRYING OUT THE INVENTION

Figure 1:
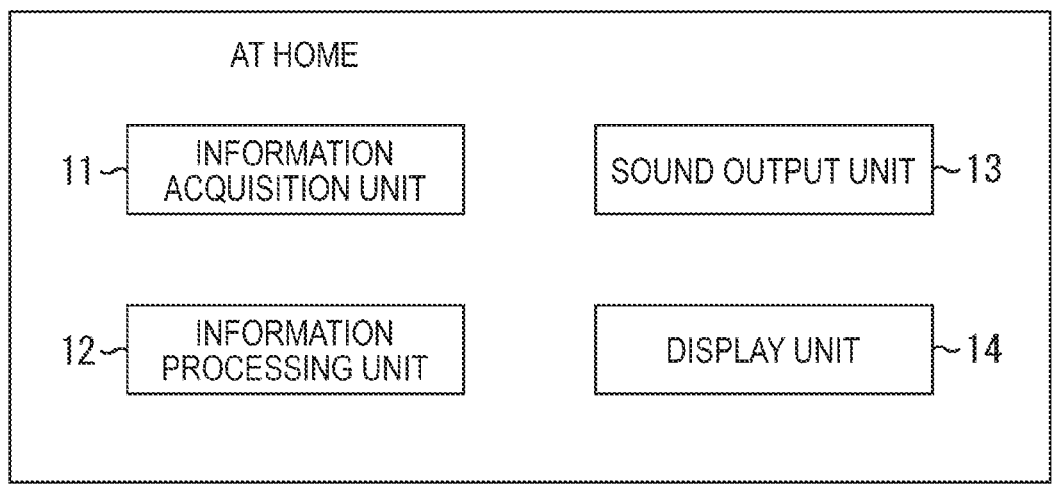
FIG. 1 is a diagram illustrating a configuration of an embodiment of an information processing system to which the present technology is applied.

Modes for carrying out the present technology (hereinafter referred to as embodiments) will be described below.
<Configuration Example of System>
FIG. 1 is a diagram illustrating a configuration of an embodiment of an information processing system to which the present technology is applied. The information processing system shown in FIG. 1 has a configuration that includes an information acquisition unit 11, an information processing unit 12, a sound output unit 13, and a display unit 14.

In the information processing system shown in FIG. 1, the information acquisition unit 11, the information processing unit 12, the sound output unit 13, and the display unit 14 are illustrated as devices installed in a home. However, as with an information processing system shown in FIG. 2, the information processing unit 12 may be installed outside the home, and may be configured to transmit/receive data to/from the information acquisition unit 11 through an out-of-home network 21.

In the information processing system shown in FIG. 1, the information acquisition unit 11, the information processing unit 12, the sound output unit 13, and the display unit 14 are installed in the home, and are connected through a network built in the home, for example, a Local Area Network (LAN) having wireless or/and wired configuration, in such a manner that data can be transmitted/received thereamong through the network.

In the information processing system shown in FIG. 1 or 2 (hereinafter, the explanation will be continued taking the information processing system shown in FIG. 1 as an example), information is acquired by the information acquisition unit 11. The acquired information is, for example, information used to determine a sight line direction of a user, positional relationship between users, and the like.

Information acquired by the information acquisition unit 11 is supplied to the information processing unit 12, and is then processed therein. The information processing unit 12 determines, for example, a sight line direction of a user, positional relationship between users, and the like.

The sound output unit 13 is, for example, a speaker, and is used when information is provided to the user with a sound. The display unit 14 is, for example, is a display, a projector or the like, and is used when information is provided to the user using a text and an image.

<Example of Processing in System>

Processing in the information processing system shown in FIG. 1 will be described with reference to FIG. 3. The information processing system is capable of notifying a predetermined user of information in such a manner that the information is not known to the other users.

Figure 3:
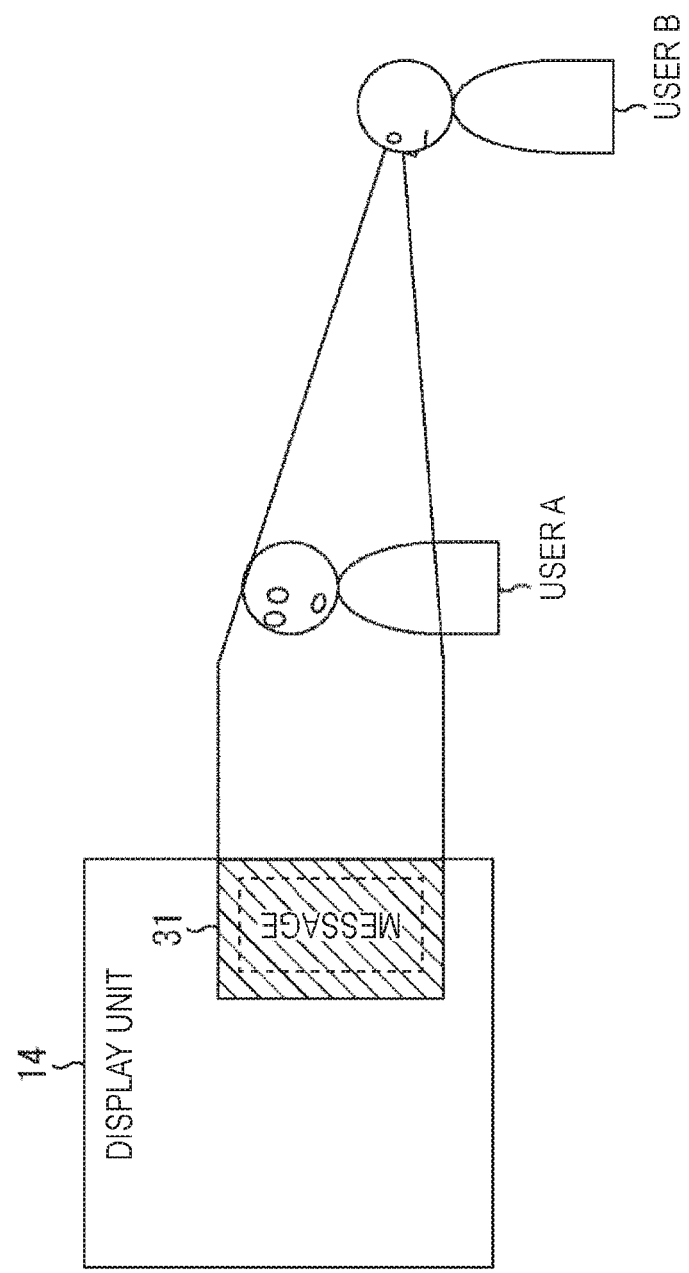
FIG. 3 is a drawing illustrating operation of the information processing system.

In a situation shown in FIG. 3, a user A and a user B exist in a predetermined room. In addition, although there is information A that is desired to be conveyed to the user A, the information A is not desired to be conveyed to the user B. Here, for example, it is assumed that the user A is the master of a house, the user B is a guest, and the master's wife (user C) wants to convey, to the user A, information that "the user C wants the user B to go home soon" (=information A).

The information that "the user C wants the user B to go home soon" is information that is not desired to be conveyed to the user B although the information is desired to be conveyed to the user A (that is to say, the information A). In such a case, the information A is displayed in a part that is a blind spot for the user B, thereby conveying the information A to the user A.

In an example shown in FIG. 3, the user A faces the display unit 14 side. The user B is located behind the user A. In the case of such a positional relationship, there arises a situation in which the user B cannot see a part of the display unit 14 due to the existence of the user A. In other words, the part of the display unit 14 is a blind spot 31 of the user B.

If the information A is displayed in the part of the display unit 14, which is the blind spot 31, the user B cannot visually recognize the information A Accordingly, in the case of the situation such as that shown in FIG. 3, the information A is displayed in the part that is the blind spot 31 of the user B. Subsequently, the user A checks the displayed information A. It should be noted that the user A may be directly notified of the information A, or may be merely notified of the existence of the information A.

In this manner, in the present technology, a positional relationship between users is detected, a part that is a blind spot of a predetermined user is detected, and information is presented in the part that is the blind spot.

<Configuration of Information Acquisition Unit>

Figure 4:
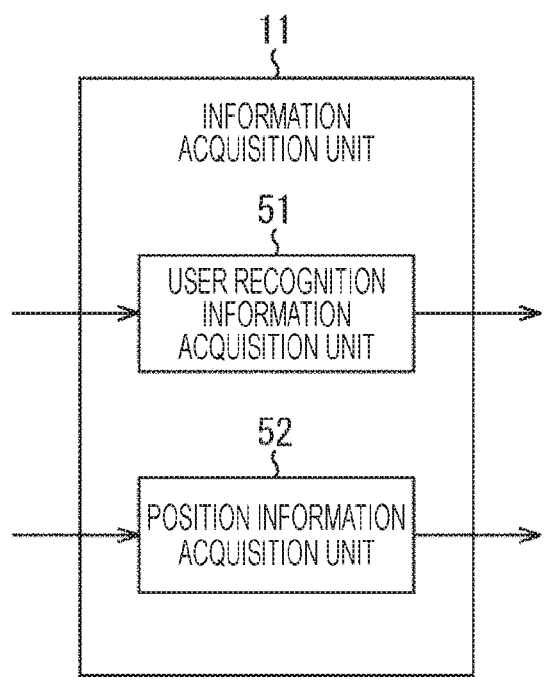
FIG. 4 is a diagram illustrating a configuration of an information acquisition unit.

Configurations of the information acquisition unit 11 and the information processing unit 12, each of which performs the processing such as that described above, will be described. First of all, the configuration of the information acquisition unit 11 will be described with reference to FIG. 4.

The information acquisition unit 11 is provided with a user recognition information acquisition unit 51 and a position information acquisition unit 52. The user recognition information acquisition unit 51 includes, for example, a camera, and a microphone. The plurality of cameras and microphones are installed in the home. For example, a home has rooms such as a living room, a dining room, a kitchen, a bedroom, a children's room, and an entrance. A microphone and a camera are installed in each room, and conversations of users are collected, or user's face images are captured.

Information acquired by the user recognition information acquisition unit 51 differs depending on processing of recognizing a user by the information processing unit 12 in the subsequent stage, and the configuration thereof also differs. For example, in a case where a user is recognized by voice recognition, the user recognition information acquisition unit 51 is provided with a microphone, and acquires a voice of the user, which is acquired by the microphone, as information used to recognize the user.

In addition, for example, in a case where a user is recognized by image recognition, the user recognition information acquisition unit 51 is provided with an image capturing unit (camera), and acquires an image of the user, which is acquired by the image capturing unit, as information used to recognize the user.

The position information acquisition unit 52 acquires, for example, information used to determine the positional relationship between users who exist in the room, and information such as a direction (sight line direction) a user faces. The position information acquisition unit 52 includes, for example, an image capturing unit, and various kinds of sensors. A plurality of image capturing units and various kinds of sensors are installed in the home. As with the user recognition information acquisition unit 51, the image capturing unit and various kinds of sensors are installed in each of rooms such as a living room, a dining room, a kitchen, a bedroom, a children's room, and an entrance. Information used to determine a user who exists in the room, and information such as a sight line direction of the user who exists in the room, are collected.

In addition, the position information acquisition unit 52 may be provided with a distance sensor, and may acquire the positional relationship between users by measuring a distance from a predetermined position to a position at which the user exists.

<Configuration of Information Processing Unit>

Information acquired by the information acquisition unit 11 is supplied to the information processing unit 12, and is then processed therein. The configuration of the information processing unit 12 will be explained with reference to FIG. 5.

The information processing unit 12 has a configuration that includes a positional relationship detection unit 71, a sight line detection unit 72, a user recognition unit 73, a user database 74, a blind spot detection unit 75, an information presentation processing unit 76, a sound output control unit 77, and a display control unit 78.

Figure 2:
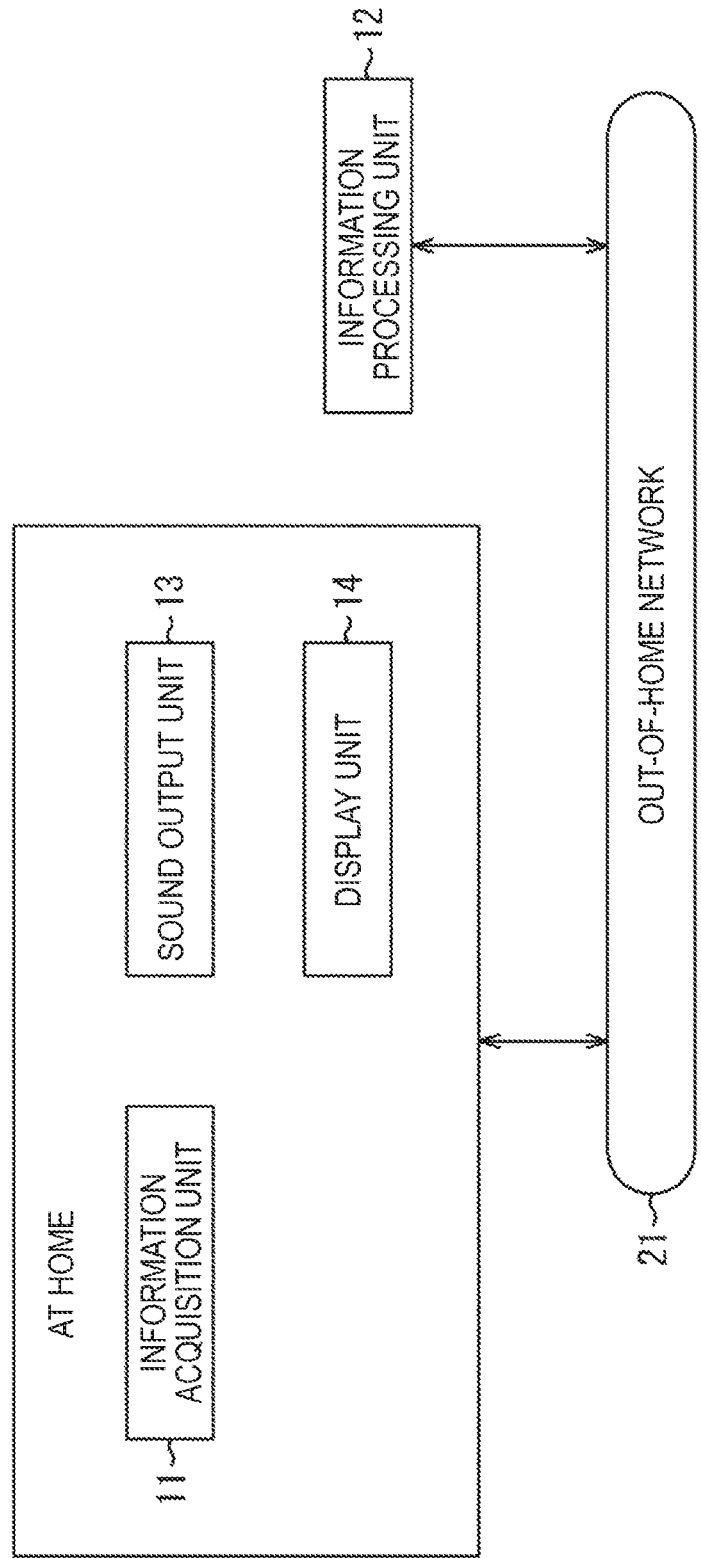
FIG. 2 is a diagram illustrating a configuration of another information processing system.
Figure 5:
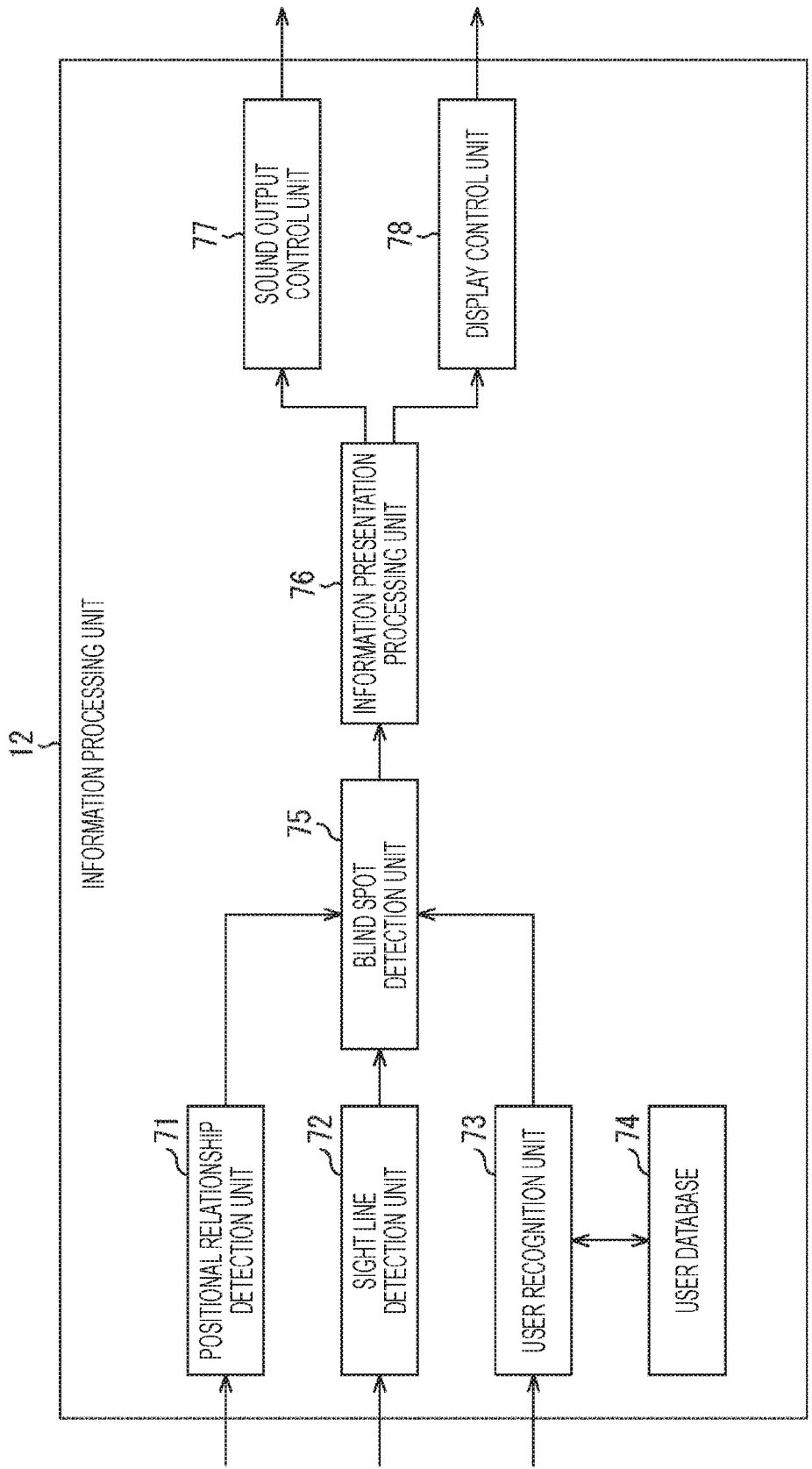
FIG. 5 is a diagram illustrating a configuration of an information processing unit.

It should be noted that as shown in FIG. 2, in a case where the information acquisition unit 11 and the information processing unit 12 are configured to transmit/receive data through the out-of-home network 21, a part of the information processing unit 12 shown in FIG. 5 may be installed in the home.

In other words, a part or all (in the case of FIG. 1) of the information processing unit 12 can be installed in the home. For example, while the user database 74 is installed in the home, the other parts may be installed outside the home. Alternatively, while the user database 74 is provided as a cloud, the other parts may be installed in the home.

Whether to install each part of the information processing unit 12 in the home or outside the home can be changed as appropriate.

The positional relationship detection unit 71 detects a positional relationship between users by using information acquired by the position information acquisition unit 52. A detection result is supplied to the blind spot detection unit 75.

The sight line detection unit 72 detects a sight line direction of a user by using information acquired by the position information acquisition unit 52. A detection result is supplied to the blind spot detection unit 75.

The user recognition unit 73 recognizes a user who exists in a predetermined room by using the information acquired from the user recognition information acquisition unit 51 or by referring to the user database 74. A recognition result is supplied to the blind spot detection unit 75.

The user database 74 is a database for recognizing a user. For example, information such as a user name (for example, a family name) and an age, and user's face data, user's voice data or the like, which is used to identify a user, are stored as necessary.

The blind spot detection unit 75 detects a blind spot of a predetermined user by using the respective detection results from the positional relationship detection unit 71, the sight line detection unit 72, and the user recognition unit 73. For example, in the example shown in FIG. 3, first of all, the positional relationship between the user A and the user B is detected by the positional relationship detection unit 71. In addition, the sight line detection unit 72 detects that the user A and the user B both face the display unit 14.

In addition, the user recognition unit 73 recognizes that the user A is a family member, and the user B is a guest. The blind spot detection unit 75 acquires such detection results and recognition results. The blind spot detection unit 75 detects a blind spot of the user B from these pieces of information.

The blind spot information detected by the blind spot detection unit 75 is supplied to the information presentation processing unit 76. The information presentation processing unit 76 performs processing of presenting the information A in a blind spot. More specifically, the information presentation processing unit 76 controls the sound output control unit 77 or/and the display control unit 78 to perform processing of presenting the information A in a blind spot.

Incidentally, the information presentation processing unit 76 acquires the information A supplied from the outside. For example, the information A transmitted from a terminal of a user who desires to convey the information A is supplied to the information presentation processing unit 76.

The sound output control unit 77 controls sound output to the sound output unit 13, which is installed in each room, on the basis of an instruction of the information presentation processing unit 76. The display control unit 78 controls displaying of a text, an image, a video and the like on the display unit 14, which is installed in each room, on the basis of an instruction of the information presentation processing unit 76.

For example, in the example shown in FIG. 3, processing of displaying the information A in the blind spot 31 on the display unit 14 is determined by the information presentation processing unit 76, and an instruction is given to the display control unit 78 so as to perform such displaying. The display control unit 78 controls the display unit 14 on the basis of the instruction, and consequently the information A is displayed in the blind spot 31 on the display unit 14.

In addition, for example, in a case where the information A is conveyed to the user A with a sound, the sound output control unit 77 controls, for example, a speaker having high directivity, and consequently the information A is conveyed to the user A with the sound.

<Installation Position of Display Unit>

Figure 6:
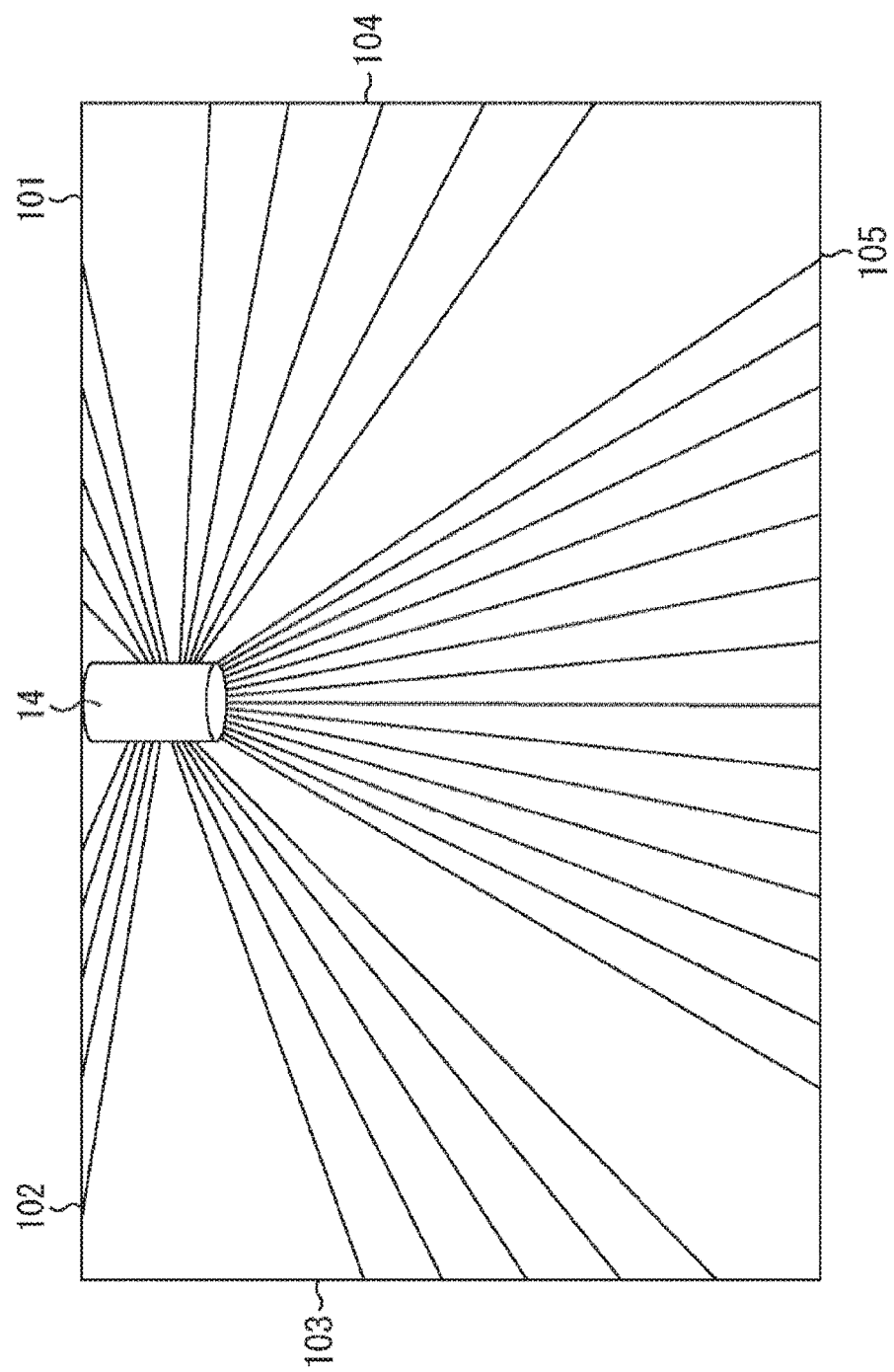
FIG. 6 is a drawing illustrating a display range.

In order to present (display) information in a blind spot of a predetermined user, the display unit 14 is installed, for example, at a position such as that shown in FIG. 6, thereby enabling the display unit 14 to display the information over a wide range.

The display unit 14 is installed on a ceiling 102 of the room 101, and is configured to be capable of displaying information everywhere in the room 101, including the ceiling 102, a wall 103, a wall 104, a floor 105, and the like in the room 101.

The display unit 14 is configured to be capable of displaying information in an area indicated with hatched lines in FIG. 6. Incidentally, the area indicated with hatched lines in FIG. 6 represents a part of a displayable area. Basically, the display unit 14 is configured to be capable of displaying information everywhere in the room 101.

For example, the display unit 14 includes a projector. The projector is configured to be capable of projecting information everywhere in the room 101. For example, by configuring the projector to be capable of moving a projection unit in a direction in which information is desired to be projected, the information can be displayed, for example, on the wall 103 or the floor 105.

In addition, as shown in FIG. 3, the display unit 14 includes a display (television receiver) or the like. The information presentation processing unit 76 (FIG. 5) determines the display unit 14 that is capable of displaying information in a part corresponding to a blind spot of a predetermined user, and controls the display control unit 78 in such a manner that the information is displayed on the determined display unit 14.

<Example of Blind Spot>

An example of the blind spot detected by the blind spot detection unit 75 will be further described. As described with reference to FIG. 3, for example, a part concealed from the user B by the user A is the blind spot 31. In addition, as shown in FIG. 7, the back of the user B himself/herself (the direction opposite to the sight line) is also the blind spot 31 for the user B.

Figure 7:
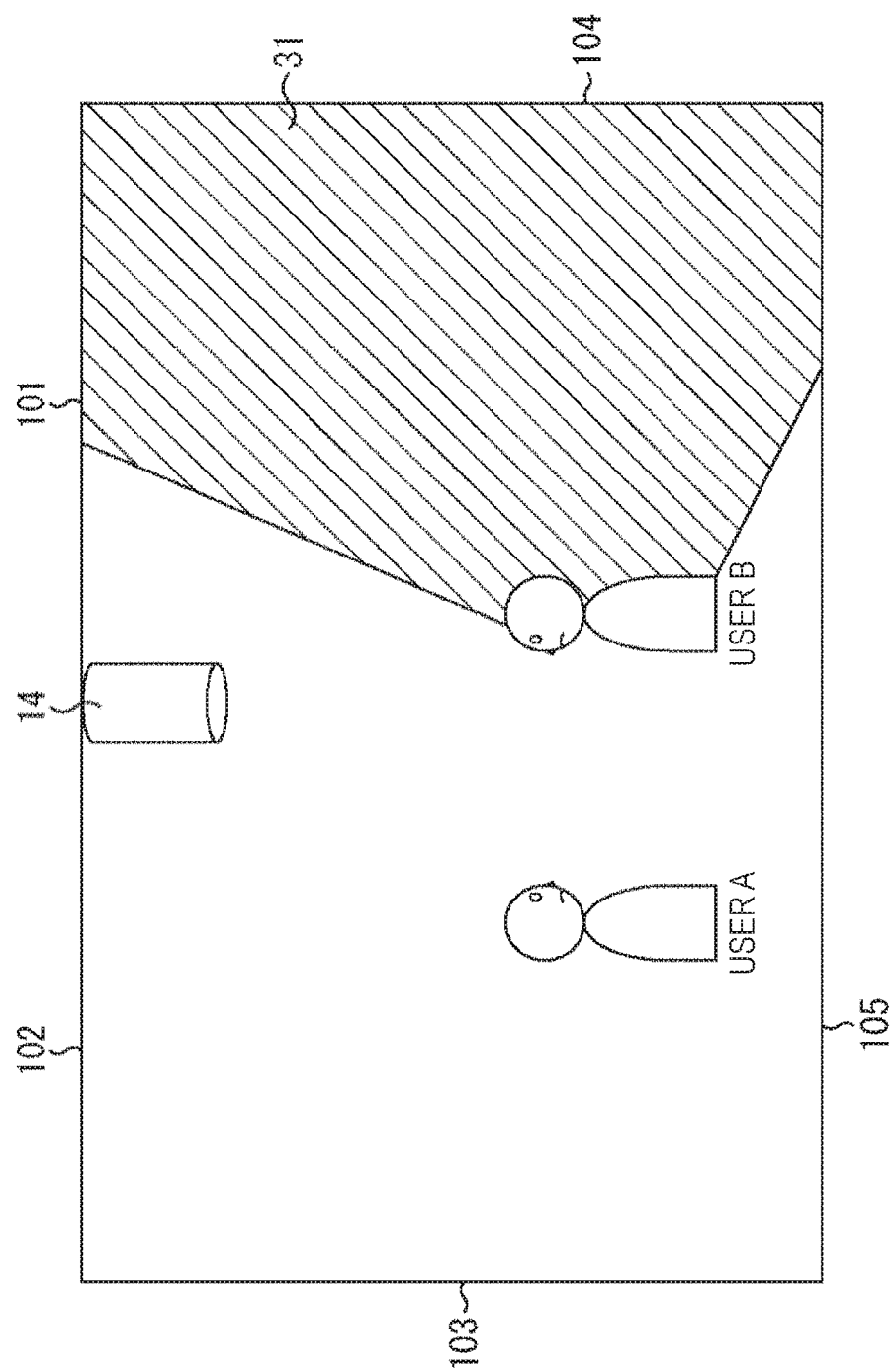
FIG. 7 is a drawing illustrating a blind spot.

Referring to FIG. 7, the user A and the user B face each other in the room 101. In such a state, the blind spot 31 for the user B is an area indicated with hatched lines in the figure. In other words, the blind spot 31 for the user B is the back side of the user B.

In such a situation, when information is desired to be conveyed to the user A, the information is displayed in the blind spot 31. For example, the display unit 14 displays the information on the wall 104. In addition, in a case where a display (not illustrated) is installed on the wall 104, the information may be displayed on the display.

Figure 8:
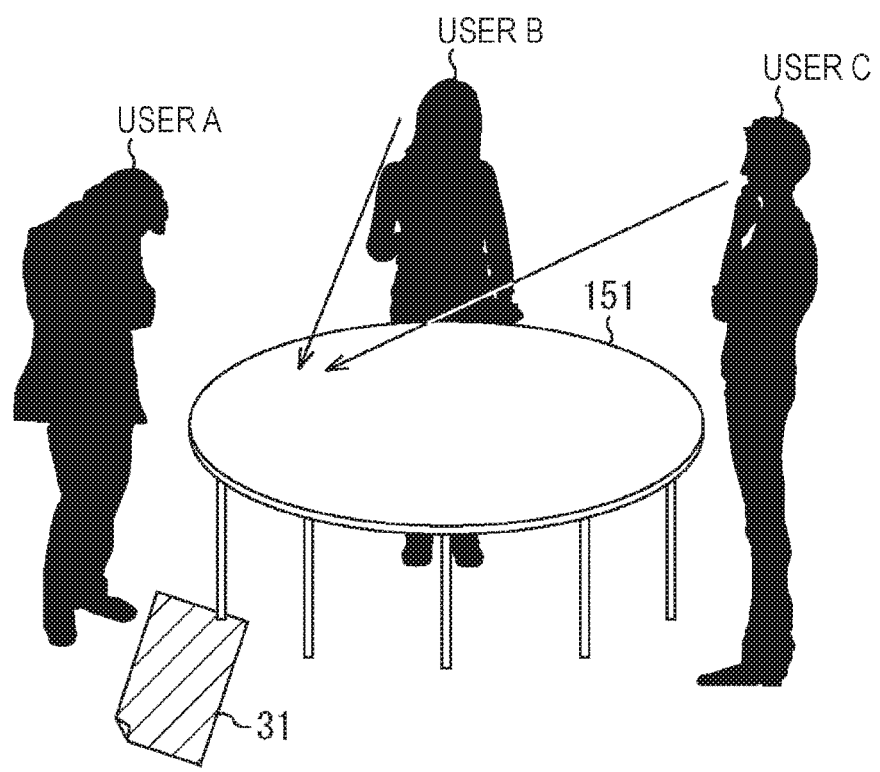
FIG. 8 is a drawing illustrating a blind spot.

FIG. 8 is a drawing illustrating an example of the blind spot detected by the blind spot detection unit 75. FIG. 8 shows a situation in which three persons of the user A, the user B and the user C exist around a table 151. For the user B and the user C, an area close to the feet of the user A is hidden by the table 151, and therefore is a part that cannot be visually recognized, that is to say, the blind spot 31.

In this manner, the part that is hidden and thus cannot be visually recognized is also detected as the blind spot 31. In a case where information is displayed in the blind spot 31 shown in FIG. 8, for example, the information may be projected from the display unit 14 installed on the ceiling 102 such as that explained with reference to FIG. 6. Alternatively, after providing the display unit 14 on the back surface of the table 151, the information may be projected from the display unit 14.

Figure 9:
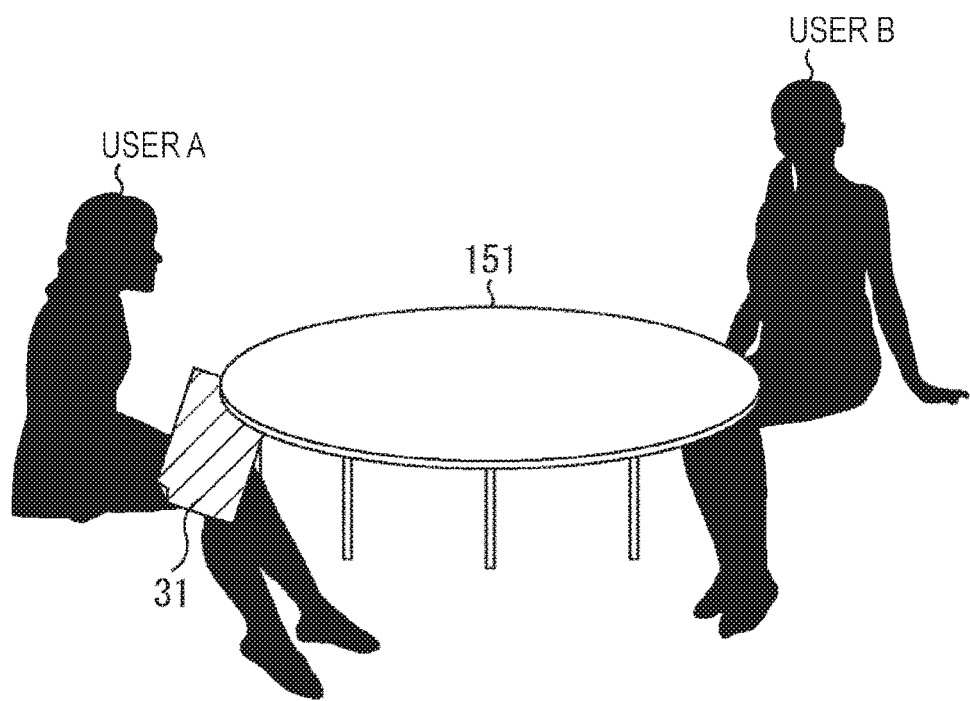
FIG. 9 is a drawing illustrating a blind spot.

FIG. 9 is a drawing illustrating an example of the blind spot detected by the blind spot detection unit 75. FIG. 9 shows a situation in which two persons of the user A and the user B exist around the table 151. For the user B, an area close to the hands of the user A (above the knees) is hidden by the table 151, and therefore is a part that cannot be visually recognized, that is to say, the blind spot 31. As with the situation shown in FIG. 8, the part that is hidden and thus cannot be visually recognized is also detected as the blind spot 31.

Although not illustrated, the blind spot 31 that uses a difference in height between the users may be detected. For example, in a case where the height of a child differs from that of the parent, when information that is not desired to be conveyed to the child is displayed, a height that cannot be seen by the child is detected as a blind spot, and the information may be displayed at the height.

<Processing Related to Display of Information>

Next, processing related to display of information will be described with reference to a flowchart shown in FIG. 10. Processing of the flowchart shown in FIG. 10 is mainly executed by the information processing unit 12.

In a step S11, users are detected. The user recognition unit 73 monitors information supplied from the information acquisition unit 11 to recognize the users who exist in a predetermined room. Such monitoring may be always performed, or may be performed when some information is provided to a predetermined user.

Figure 10:
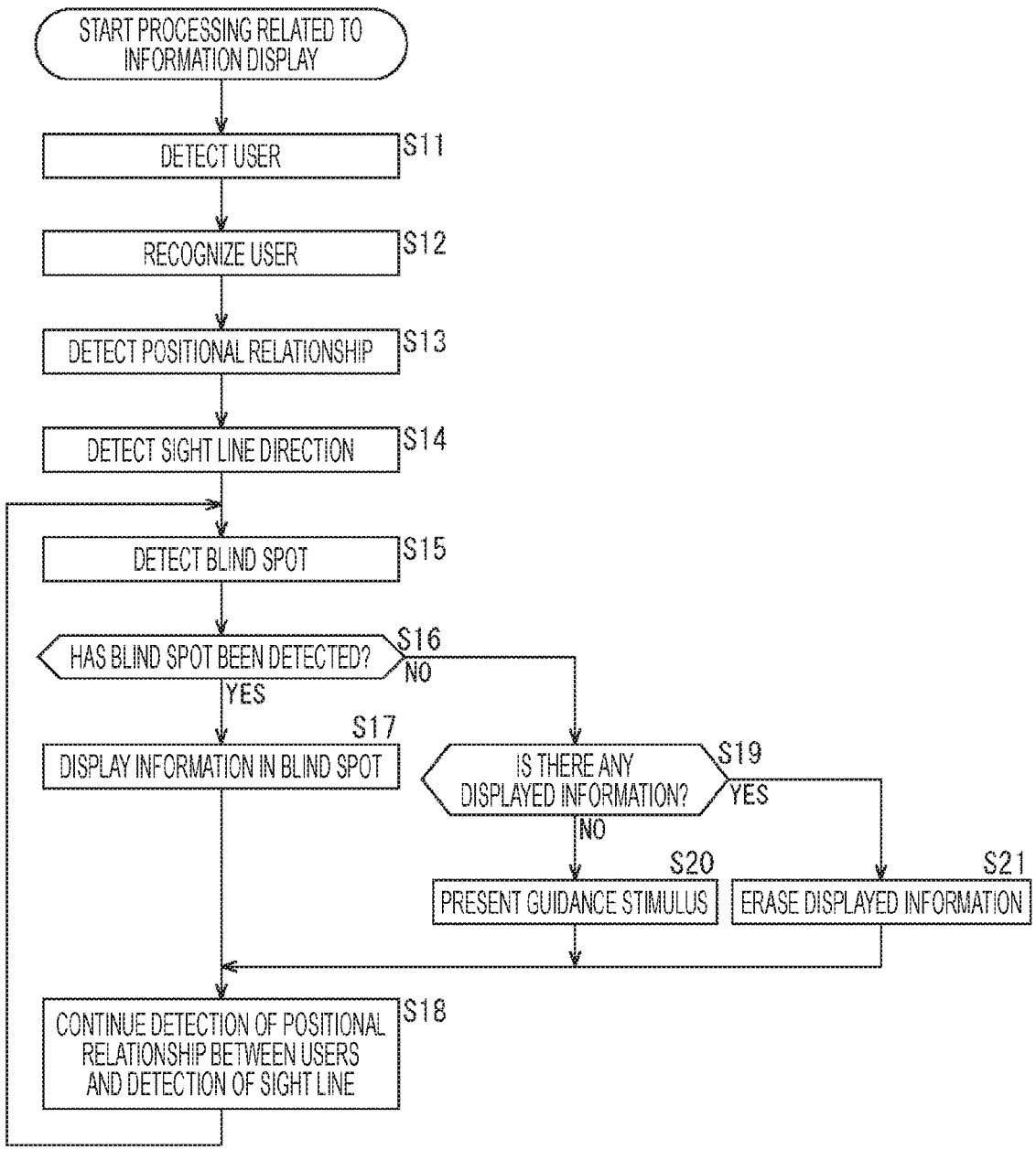
FIG. 10 is a flowchart illustrating operation of the information processing system.

In other words, the processing based on the flowchart shown in FIG. 10 may be started when some information is provided to a predetermined user, or may be always performed.

In a step S12, the user recognition unit 73 refers to information supplied from the information acquisition unit 11, and refers to the user database 74, to recognize the users who exist in the predetermined room. For example, in a case where image data is supplied from the information acquisition unit 11, a face part is extracted from an image based on the image data. Subsequently, the extracted face is subjected to matching with face data registered in the user database 74, thereby identifying the users.

The user recognition unit 73 recognizes users other than the users registered in the user database 74 as guests (guests). Needless to say, for example, in a case where information such as face image data is stored in the user database 74 as a guest as well, the guest is recognized as a guest.

In a step S13, the positional relationship detection unit 71 identifies positions of the users by using information from the information acquisition unit 11. For example, each part in which the user exists is identified from a captured image, thereby detecting positions of the users.

In a step S14, the sight line detection unit 72 detects a sight line direction. For example, a part of user's eyes is extracted from the captured image, and by determining a direction in which the eyes face, a sight line direction of the user is detected.

In a step S15, the blind spot detection unit 75 detects a blind spot. From user information recognized by the user recognition unit 73, the blind spot detection unit 75 identifies users other than a user to whom information is desired to be presented, in other words, users to whom information is not desired to be presented (users from whom information is desired to be concealed). For example, a user who has been determined to be a guest is identified.

The blind spot detection unit 75 sets, as a blind spot area, directions other than the sight line direction of the user who has been identified as a user to whom information is not desired to be presented. For example, the back side of the user B such as that explained with reference to FIG. 7 is set as a blind spot area.

In addition, in a case where an obstruction exists in the sight line direction of the user who has been identified as a user to whom information is not desired to be presented, a direction in which the obstruction exists is set as a blind spot area. For example, the areas close to the feet or hands of the user A, in which the sight line of the user B is obstructed by the table 151 (obstruction), such as those explained with reference to FIGS. 8 and 9, are set as blind spot areas of the user B.

In a case where a plurality of users to whom information is not desired to be presented exist, a blind spot area is set for each of the users. Subsequently, an area in which the plurality of set blind spot areas overlap is set as a final blind spot area.

In this manner, in a step S16, whether or not a blind spot has been detected is determined. In the step S16, in a case where it is determined that a blind spot has been detected, the process proceeds to a step S17. In the step S17, the information presentation processing unit 76 executes processing of presenting information in the blind spot area detected by the blind spot detection unit 75 as a blind spot.

In this manner, while the information is displayed in the blind spot, processing of detecting a positional relationship between users, and processing of detecting a sight line, are continuously executed in a step S18. Subsequently, the process returns to the step S15, and the subsequent processing is repeatedly executed.

By repeating the processing of the steps S15 to S18, information is presented to a user (the user A) to whom information is desired to be presented unless the sight line direction or position of the user (the user B) to whom information is not desired to be presented changes. However, when the sight line direction or position of the user B changes, with the result that the blind spot of the user B changes, there is a possibility that the presented information will be brought into a state in which the presented information can be visually recognized by the user B.

In addition, a blind spot is not detected, and consequently there is also a possibility that a situation in which the information cannot be presented to the user A will occur. In order to cope with such a situation, processing of a step S19 and subsequent steps is executed.

In the step S16, in a case where it is determined that a blind spot has not been detected, the process proceeds to the step S19. In the step S19, whether or not displayed information exists is determined. In the step S19, in a case where it is determined that displayed information does not exist, the process proceeds to a step S20.

When the process proceeds to the step S20, no blind spot exists, and thus displayed information does not exist. If such a state is expressed in other words, although information is desired to be conveyed to the user A, the information cannot be presented because there is no blind spot for the user B.

In the step S20, a guidance stimulus is presented. The guidance stimulus is a stimulus that is given to a user to whom information is desired to be presented, in this case, the user A for the purpose of informing the user A that there is information that is desired to be presented, and then guiding the user A to perform the operation of, for example, looking at such an area that is a blind spot of the user B, or moving to such a place that is a blind spot of the user B.

For example, a mark indicating that information exists, for example, a mark such as a circle and a square, is displayed in a sight line direction of the user A. The user A who has visually recognized such a mark performs predetermined operation of, for example, directing a sight line toward an area that is a blind spot of the user B, or moving to a place that is a blind spot of the user B.

The processing of the step S15 is executed again after the processing of the step S20. Therefore, when the user A directs a sight line toward an area that is a blind spot of the user B, the blind spot is detected, which results in a state in which information can be displayed in the blind spot.

In addition, for example, the user A who has visually recognized a mark may check information by using an individual terminal, for example, a portable telephone, a smart phone, a personal computer or the like. In this manner, processing of guiding to an individual terminal may be presented as a guidance stimulus.

Moreover, for example, a guidance stimulus may be performed by using a sound. For example, a sound for a specific user (for example, a sound for the user A) may be set beforehand, and when the sound is emitted, it is indicated that information for the user A exists.

When a sound assigned to the user A himself/herself is emitted, if the user A performs predetermined operation of, for example, directing a sight line toward an area that is a blind spot of the user B, or moving to a place that is a blind spot of the user B, the information can be presented to the user A.

In addition, for example, by moving a sound image of a sound, or by moving a display position of the above-described mark, the user A to whom information is desired to be presented may be guided to a place in which information can be presented while the information is concealed from the user B. Moreover, for example, after the user A is called by the name of the user A, information may be displayed in the predetermined place.

Further, for example, information may be presented by learning a method in which a user is easily guided, and then applying the learned method as a guidance stimulus. Furthermore, for example, information may be presented by predicting user's original behavior, and by giving a guidance stimulus so as not to hinder the behavior.

Incidentally, such a guidance stimulus is given when a blind spot is not detected while information that is desired to be presented exists. Besides the above case, a guidance stimulus may be given before information is presented to a user, so as to make the user recognize that presentation of the information is started.

For example, in the step S17, presentation of information may be performed after directing attention of the user A by, before information is displayed in a blind spot, displaying the above-described mark in the blind spot, emitting a specific sound, or speaking the name of the user.

In addition, in a case where a call is made by the name or the like of the user, a way of calling may differ depending on a user who is called. More specifically, in the case of a call made to an adult, his/her name is not used, but a way of speaking, for example, an intonation or a tempo is changed. In the case of a child, his/her name is called.

Moreover, in a case where a call is made, a call may be made in such a manner that when the sight line of the user is maintained, in other words, when the user faces in the blind spot direction, a call is not made, and a call is made only when the sight line is not maintained.

Further, in a case where the above-described learning is performed, for example, when a method that is easily accepted from the viewpoint of the notification timing or the notification method differs depending on a user, the notification timing or the notification method suitable for the user may be learned. For example, in a case where a favorable reaction is achieved in the morning or before going to bed, when immediacy is not required, a notification may be made in the timing in which such a favorable reaction is achieved.

In addition, for example, depending on a user, targeted learning includes: when a sound is used, a favorable reaction is achieved; when blinking of a predetermined mark is used, a favorable reaction is achieved; and when a way of speaking (an intonation and a tempo) is changed, a favorable reaction is achieved, and the like. Therefore, on the basis of a result of the learning, a guidance stimulus can be given, or display for making the user recognize that information will be presented can be performed before the information is presented, for example.

Moreover, for example, a user who is approaching the display (the display unit 14) is recognized, and as a result of the recognition, in a case where the user is a user to whom information is desired to be presented, the user may be guided to a fixed position corresponding to the user, and the information may be presented in the guided destination. For example, the user is guided to a sitting position of the dining table, and the information is then presented.

Returning to the explanation made with reference to the flowchart shown in FIG. 10, in the step S20, when a guidance stimulus is presented, the process proceeds to the step S18. In other words, in a case where some change has occurred as the result of presenting a guidance stimulus, for example, the user A has directed the sight line toward the blind spot direction of the user B, or has moved in the room, in order to detect the change, the positional relationship and sight line direction of the user are detected, and processing of detecting a blind spot is performed.

Such a change includes not only a change of the user A to whom information is desired to be presented, but also a change of the user B from whom information is desired to be concealed. In other words, there is a possibility that the user B also will change a sight line direction or move.

Figure 11:
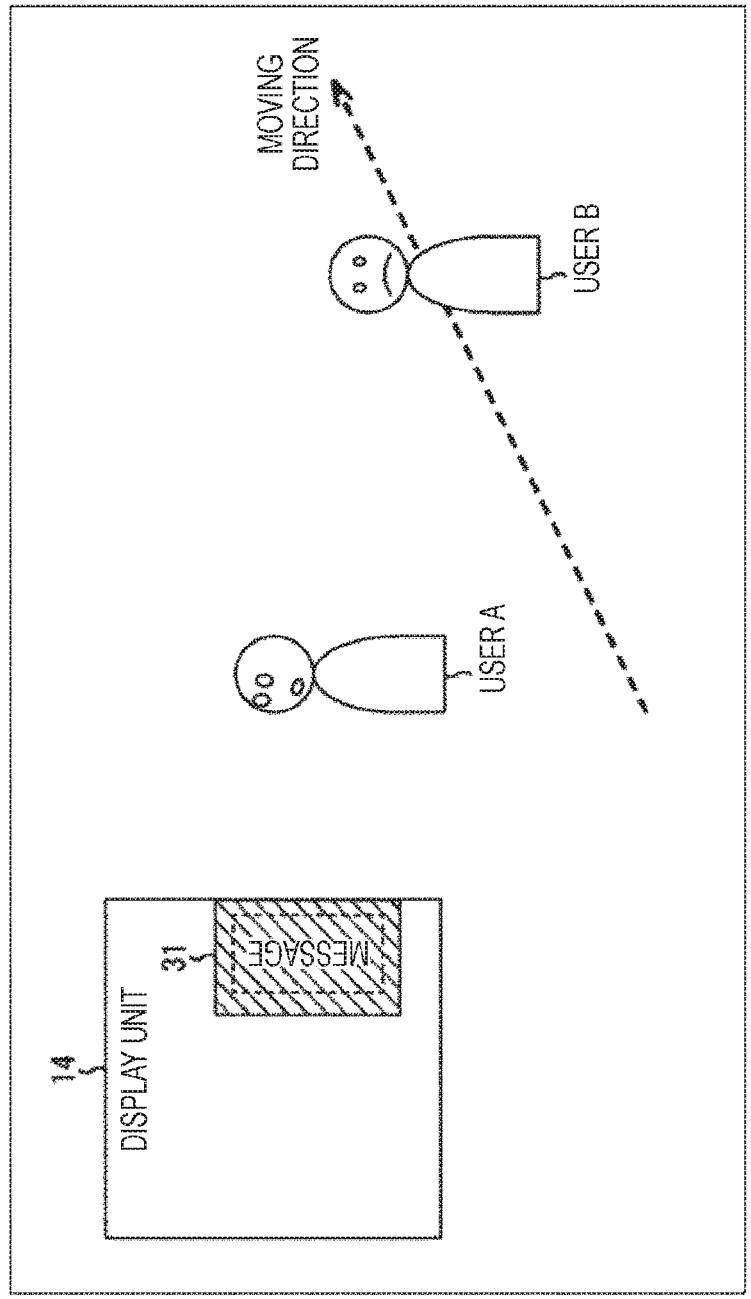
FIG. 11 is a drawing illustrating information presentation in which expected movement of a user is considered.

A change of the user B will be described with reference to FIG. 11. As with the state shown in FIG. 3, FIG. 11 also shows a state in which the user A and the user B exist. The user A is a user to whom information is desired to be presented, and the user B is a user from whom information is desired to be concealed.

The user B is moving in an arrow direction in the figure. Moving of the user B causes an area that is a blind spot hidden by the user A to differ. Accordingly, even if there is no blind spot for the user B at a certain point of time, moving of the user B may generate a part that is a blind spot.

In this manner, there is a possibility that moving of the user B will generate a blind spot. Such a change is also regarded as a detection target.

Such moving of the user B may be taken into consideration when a blind spot is detected. For example, moving speed of the user B is predicted, the timing in which the blind spot 31 is generated is predicted, and the control can be performed in such a manner that information is displayed in the blind spot 31 in the timing.

In addition, in a case where information is desired to be concealed from the moving user B, display of the information may be controlled by the moving speed of the user B. For example, in a case where the moving speed of the user B is high, the control can be performed in such a manner that information is displayed after waiting until the user B passes through. Moreover, in a case where the moving speed of the user B is low, or in a case where the user B stays (stops), the control can be performed in such a manner that a blind spot of the user B is detected, and information is displayed in the blind spot.

For example, before processing of the step S15 and subsequent steps is executed, the moving speed of the user B is detected and whether or not to detect a blind spot is determined by the moving speed. When it is determined that a blind spot is detected, processing of the step S15 and subsequent steps may be executed.

In addition, Information related to, for example, whether or not a user is moving and the moving speed while a user is moving can be detected by the positional relationship detection unit 71. For example, when processing of the step S13 is executed, the positional relationship detection unit 71 can detect not only the positional relationship but also other information such as the moving speed. Moreover, in this case, a moving direction is also predicted, and the moving direction can be used in the processing of the subsequent stage.

In addition, after a moving direction of the user B from whom information is desired to be concealed is predicted, when the user B has moved in the predicted moving direction, an area that is a blind spot is detected and the information may be displayed in the area that is the blind spot.

Moreover, there is also a case where the user A to whom information is desired to be presented is moving. In a case where information is desired to be presented when the user A is moving, when the moving speed of the user A is high, the above-described guidance stimulus such as a call may be presented, and processing that attracts attention of the user A may be executed. Further, such a call may be made in such a manner that in a case where an importance level of the information to be presented is high, a call is made, whereas in a case where an importance level of the information to be presented is low, a call is not made.

Furthermore, in a case where, after the moving speed and moving direction of the user A to whom information is desired to be presented are detected, the user A has moved at the detected moving speed in the detected moving direction, an area that is a blind spot of the user B from whom information is desired to be concealed may be detected at the destination, and the information may be displayed in the blind spot.

Returning to the explanation made with reference to the flowchart shown in FIG. 10, in the step S19, in a case where it is determined that displayed information exists, the process proceeds to a step S21. When the process proceeds to the step S21, it is determined that no blind spot exists, and it is determined that displayed information exists.

In other words, this is a case where although there was a blind spot in which information was displayed, some change of the user A to whom information is desired to be presented or/and the user B from whom information is desired to be concealed occurs, and consequently the above state has changed to a state in which no blind spot exists.

In such a state, there is a possibility that the information will be visually recognized by the user B. Therefore, in the step S21, the displayed information is erased (brought into a state in which the displayed information is not displayed). Subsequently, the process proceeds to the step S18, and the subsequent processing is repeated.

By repeating the processing of the step S18 and subsequent steps, in a case where a blind spot is generated again, information is displayed in the blind spot.

In this manner, in a case where a sight line of the user changes, a predicted moving direction (moving locus) of the user is not as expected, or the user turns around, and consequently a state changes, processing of erasing presented information, or processing of displaying information that could not have been displayed because of no blind spot, is performed as appropriate.

Incidentally, the control can also be performed in such a manner that the displayed information is erased after the lapse of the predetermined time, or the displayed information is erased when a user who has checked information performs some kind of action indicating that the information has been checked.

In addition, there may be provided such a mechanism that feeds back, to a sender of information, a notification that information has been presented to a user to whom the information is desired to be presented. Moreover, there may be provided such a mechanism that, as the result of having presented information, when it can be checked that the user has checked the information, feeds back, to a sender, a notification that the user has checked the information.

As described above, the position, sight line direction, moving direction and the like of the user are acquired, a blind spot of the user is detected, and information is displayed in the detected blind spot. Accordingly, information can be prevented from being presented to a user to whom the information is not desired to be presented.

In addition, displaying can be performed in consideration of not only a display place of information, but also the timing of displaying the information, and movement of the user.

In addition, in the embodiment described above, the information may be displayed only in the predetermined room. The information may be displayed in such a room where a guest does not enter, for example, in a kitchen, a bedroom, or the like. When the information is displayed, the user may be guided into the room. When the user is guided, the blind spot such as that described above is detected, and the information for guiding may be displayed in the detected blind spot.

Moreover, in the embodiment described above, a case where information is presented to the user by displaying the information on the display unit 14 has been explained as an example. However, the information can also be presented with a sound.

Figure 12:
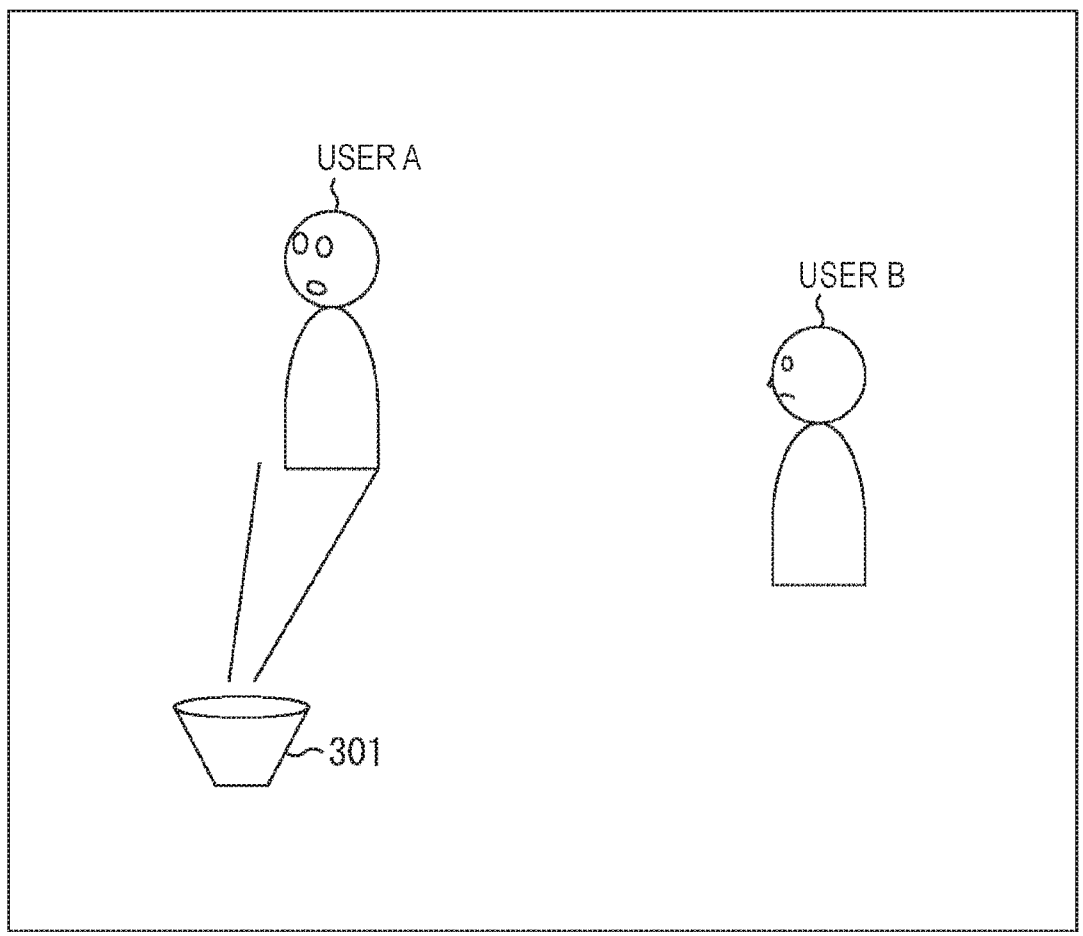
FIG. 12 is a drawing illustrating information presentation with a sound.

For example, as shown in FIG. 12, information may be conveyed to the user A with a sound from the speaker 301 having high directivity. In FIG. 12, the user A is a user to whom information is desired to be conveyed, and the user B is a user from whom information is desired to be concealed.

When the user B does not exist between the speaker 301 having high directivity and the user A, in other words, when the user A exists within a range in which a sound from the speaker 301 reaches and the user B exists within a range in which the sound from the speaker 301 does not reach, a sound is emitted from the speaker 301 and information is presented to the user A.

In addition, in a case where the user presents information with a sound, a sound image may be localized, for example, in a place where the user A always exists.

Moreover, theme music may be determined on a user basis, and information may be presented together with the theme music. Music that is registered by the user himself/herself, or music that is willingly listened to by the user, can be set as the theme music.

Further, in a case where information is presented with a sound, masking may be performed, for example, by playing music for a user to whom information is not desired to be presented, and then by making a volume of the music larger.

Similarly, in a case where information is presented by displaying as well, masking may be performed. For example, masking may be performed by, together with information that is desired to be presented, presenting many pieces of visual information that resembles the information.

In addition, needless to say, it is also possible to present information by using not only the sound but also the display described above in combination.

The presentation of information in the above-described embodiment can be used, for example, when information is presented to a family member in the home while a guest is visiting the home. Moreover, the presentation of information can be used when information that is not desired to be known by a child is presented to an adult in the home.

Further, the presentation of information can be applied when information is desired to be presented to a predetermined visitor, for example, in a meeting place of a party. Furthermore, the presentation of information can also be applied when information is presented to only a predetermined attendant in a poster session or the like of an academic society, for example.

<About Recording Medium>

The above-described series of processing can be executed either by hardware or by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose personal computer, and the like.

Figure 13:
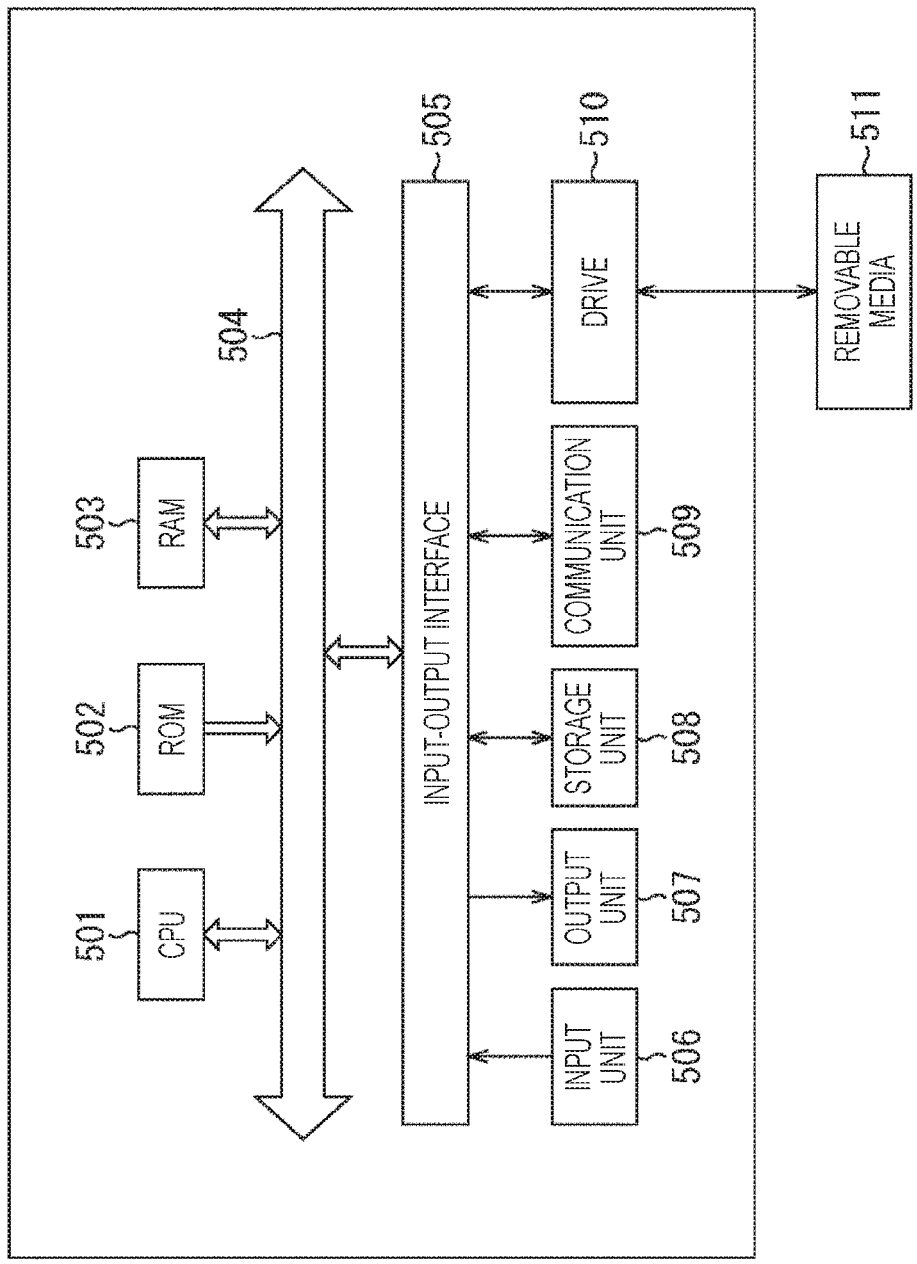
FIG. 13 is a diagram illustrating a recording medium.

FIG. 13 is a block diagram illustrating, as an example, a hardware configuration of a computer that executes the above-described series of processing by a program. For example, the information processing unit 12 (FIG. 5) can be configured by a computer.

In the computer, a Central Processing Unit (CPU) 501, a Read Only Memory (ROM) 502, and a Random Access Memory (RAM) 503 are mutually connected through a bus 504. An input-output interface 505 is further connected to a bus 504. An input unit 506, an output unit 507, a storage unit 508, a communication unit 509, and a drive 510 are connected to the input-output interface 505.

The input unit 506 includes a keyboard, a mouse, a microphone, and the like. The output unit 507 includes a display, a speaker, and the like. The storage unit 508 includes a hard disk, a nonvolatile memory and the like. The communication unit 509 includes a network interface. The drive 510 drives a removable media 511 such as a magnetic disk, an optical disk, a magneto-optical disk, a semiconductor memory, or the like.

In the computer that is configured as described above, the CPU 501 loads, for example, a program stored in the storage unit 508 into the RAM 503 through the input-output interface 505 and the bus 504, then executes the program, and consequently the above-described series of processing is performed.

The program executed by the computer (CPU 501) can be provided by being recorded, for example, in a removable media 511 such as a package media. In addition, the program can be provided through a wired or wireless transmission medium such as a local area network, the Internet, and digital satellite broadcasting.

In the computer, the program can be installed in the storage unit 508 through the input-output interface 505 by mounting the removable media 511 to the drive 510. In addition, the program can be received by the communication unit 509 through a wired or wireless transmission medium, and can be installed in the storage unit 508. Besides the above, the program can be installed in the ROM 502 or the storage unit 508 beforehand.

It should be noted that the program executed by the computer may be a program in which processing is time-sequentially performed along the order described herein, or may be a program in which processing is performed in parallel or in the required timing, for example, when a call is made.

In addition, the system herein represents devices as a whole which include a plurality of devices.

It should be noted that the effects described herein are to be construed as merely illustrative, and are not limitative, and that, in addition, other effects may be produced.

It should be noted that embodiments of the present technology are not limited to the embodiments described above, and various modifications can be made within the scope that does not deviate from the gist of the present technology.

It should be noted that the present technology can also employ the following configurations.

(1)

An information processing device including:

a positional relationship detection unit that detects a positional relationship among a plurality of users;

a detection unit that detects a blind spot of a first user among the plurality of users; and a display control unit that performs control for displaying information in the blind spot detected by the detection unit.

(2)

The information processing device set forth in the preceding (1), further including a sight line detection unit that detects a sight line direction of a second user, in which the display control unit performs control for displaying the information in the blind spot located in the sight line direction of the second user.

(3)

The information processing device set forth in the preceding (1) or (2), further including a sight line detection unit that detects a sight line direction of the first user, in which the detection unit detects, as the blind spot, a part that is not in the sight line direction of the first user.

(4)

The information processing device set forth in any of the preceding (1) to (3), in which the detection unit detects, as the blind spot, a part in which the sight line of the first user is obstructed by an obstruction.

(5)

The information processing device set forth in any of the preceding (1) to (4), in which the detection unit detects a moving speed of the first user, and when the first user has moved at the detected moving speed, the detection unit detects an area that is a blind spot.

(6)

The information processing device set forth in the preceding (5), in which in a case where the detection unit has detected that the moving speed of the first user is high, the display control unit controls display in such a manner that information is displayed in the blind spot after the first user passes through.

(7)

The information processing device set forth in any of the preceding (1) to (6), in which the detection unit predicts a moving direction of the first user, and when the first user has moved in the predicted moving direction, the detection unit detects an area that is a blind spot.

(8)

The information processing device set forth in the preceding (1), in which the detection unit detects a moving direction and a moving speed of the second user, and when the second user has moved in the detected moving direction at the moving speed, the detection unit detects an area that is a blind spot of the first user.

(9)

The information processing device set forth in any of the preceding (1) to (8), in which the display control unit performs display control for making the second user recognize that information to be notified to the second user exists.

(10)

The information processing device set forth in any of the preceding (1) to (9), in which the display control unit performs display control for guiding to a predetermined position where the information to be notified to the second user is displayed.

(11)

The information processing device set forth in any of the preceding (1) to (10), in which the display control unit performs the control for projecting the information in the blind spot to display the information.

(12)

The information processing device set forth in any of the preceding (1) to (11), in which the display control unit performs control for displaying the information in a display installed in the blind spot.

(13)

The information processing device set forth in the preceding (1), in which the display control unit performs display control for making the second user recognize that the information is displayed in an individual terminal of the second user.

(14)

The information processing device set forth in any of the preceding (1) to (13), further including a sound output control unit that performs control for presenting the information to the second user with a sound.

(15)

The information processing device set forth in the preceding (14), in which the sound output control unit performs sound output control for making the second user recognize that information to be notified to the second user exists.

(16)

The information processing device set forth in the preceding (14) or (15), in which the sound output control unit performs sound output control for guiding to a predetermined position where the information to be notified to the second user is required to be notified is displayed.

(17)

The information processing device set forth in any of the preceding (14) to (16), in which the sound output control unit controls output of a sound by a speaker having high directivity.

(18)

An information processing method including the steps of:

detecting a positional relationship among a plurality of users;

detecting a blind spot of a first user among the plurality of users; and performing control for displaying information in the detected blind spot.

(19)

A program for causing a computer to execute processing including the steps of:

detecting a positional relationship among a plurality of users;

detecting a blind spot of a first user among the plurality of users; and performing control for displaying information in the detected blind spot.

REFERENCE SIGNS LIST

11 Information acquisition unit
12 Information processing unit
13 Sound output unit
14 Display unit
31 Out-of-home network
51 User recognition information acquisition unit
52 Position information acquisition unit
71 Positional relationship detection unit
72 Sight line detection unit
73 User recognition unit
74 User database
75 Blind spot detection unit
76 Information presentation processing unit
77 Sound output control unit
78 Display control unit

The invention claimed is:
1. An information processing device, comprising:
a central processing unit (CPU) configured to:
recognize a first user and a second user from a plurality of users based on first information, wherein a result of the recognition includes an identification of each of the first user and the second user;
detect a positional relationship between the first user and the second user;
detect a blind spot of the first user based on the detected positional relationship and the result of the recognition,
wherein the blind spot of the first user corresponds to an area of a display screen that is not visually recognizable by the first user; and
control the display screen to display second information in the area corresponding to the detected blind spot of the first user;
wherein the displayed second information is not visually recognizable by the first user and the displayed second information is visually recognizable by the second user.

2. The information processing device according to claim 1, wherein
the CPU is further configured to: detect a sight line direction of the second user, and
the detected blind spot is located in the detected sight line direction of the second user.

3. The information processing device according to claim 1, wherein the CPU is further configured to:
detect a sight line direction of the first user; and
detect, as the blind spot, the area of the display screen that is not in the detected sight line direction of the first user.

4. The information processing device according to claim 1, wherein the CPU is further configured to:
detect a sight line direction of the first user; and
detect, as the blind spot, the area of the display screen in which the detected sight line direction of the first user is obstructed by an obstruction.

5. The information processing device according to claim 1, wherein the CPU is further configured to:
detect a speed of movement of the first user; and
detect the area of the display screen as the blind spot based on the detected speed of the movement of the first user.

6. The information processing device according to claim 5, wherein
the CPU is further configured to control the display screen to display the second information in the area corresponding to the detected blind spot after the first user passes through, and
the display of the second information is based on the detected speed of the movement of the first user that is greater than a specific speed.

7. The information processing device according to claim 1, wherein the CPU is further configured to:
predict a direction of movement of the first user; and
detect the area of the display screen as the blind spot based on the movement of the first user in the predicted direction.

8. The information processing device according to claim 1, wherein the CPU is further configured to:
detect each of a direction of movement of the second user and a speed of the movement of the second user; and
detect the area of the display screen as the blind spot of the first user based on the detected direction of the movement of the second user and the detected speed of the movement of the second user.

9. The information processing device according to claim 1, wherein the CPU is further configured to notify the second user that the second information associated with the second user exists.

10. The information processing device according to claim 1, wherein
the CPU is further configured to control the display screen to display a guidance stimulus for guidance of the second user to a specific position where the second information is to be displayed, and
the second information is associated with the second user.

11. The information processing device according to claim 1, wherein the CPU is further configured to control projection of the second information in the area corresponding to the detected blind spot.

12. The information processing device according to claim 1, wherein the CPU is further configured to control the display screen to display a guidance stimulus for guidance of the second user such that the second user recognizes that the second information is displayed in an individual terminal of the second user.

13. The information processing device according to claim 1, wherein the CPU is further configured to control a speaker to emit a first sound for presentation of the second information to the second user.

14. The information processing device according to claim 13, wherein the CPU is further configured to control the speaker to emit a second sound to notify the second user that the second information associated with the second user exists.

15. The information processing device according to claim 13, wherein the CPU is further configured to control the speaker to emit a third sound for guidance of the second user to a specific position where the second information is to be displayed.

16. The information processing device according to claim 13, wherein the speaker has high directivity.

17. An information processing method, comprising:
recognizing a first user and a second user from a plurality of users based on first information,
wherein a result of the recognition includes an identification of each of the first user and the second user;
detecting a positional relationship between the first user and the second user;
detecting a blind spot of the first user based on the detected positional relationship and the result of the recognition,
wherein the blind spot of the first user corresponds to an area of a display screen that is not visually recognizable by the first user; and
controlling the display screen to display second information in the area corresponding to the detected blind spot of the first user,
wherein the displayed second information is not visually recognizable by the first user and the displayed second information is visually recognizable by the second user.

18. A non-transitory computer-readable medium having stored thereon computer-executable instructions that, when executed by a processor, cause the processor to execute operations, the operations comprising:
recognizing a first user and a second user from a plurality of users based on first information,
wherein a result of the recognition includes an identification of each of the first user and the second user;
detecting a positional relationship between the first user and the second user;

detecting a blind spot of the first user based on the detected positional relationship and the result of the recognition,
   wherein the blind spot of the first user corresponds to an area of a display screen that is not visually recognizable by the first user; and
controlling the display screen to display second information in the area corresponding to the detected blind spot of the first user,
   wherein the displayed second information is not visually recognizable by the first user and the displayed second information is visually recognizable by the second user.

\* \* \* \* \*